(12) United States Patent  
Hoyos

(10) Patent No.: US 9,208,492 B2  
(45) Date of Patent: Dec. 8, 2015

(54) SYSTEMS AND METHODS FOR BIOMETRIC AUTHENTICATION OF TRANSACTIONS

(71) Applicant: Hoyos Labs Corp., Caguas, PR (US)

(72) Inventor: Hector Hoyos, New York, NY (US)

(73) Assignee: HOYOS LABS CORP., San Juan, PR (US)

( * ) Notice: Subject to any disclaimer, the term of this patent is extended or adjusted under 35 U.S.C. 154(b) by 0 days.

(21) Appl. No.: 14/201,438

(22) Filed: Mar. 7, 2014

(65) Prior Publication Data

US 2014/0337221 A1    Nov. 13, 2014

Related U.S. Application Data

(60) Provisional application No. 61/822,746, filed on May 13, 2013, provisional application No. 61/842,800, filed on Jul. 3, 2013, provisional application No. 61/842,739, filed on Jul. 3, 2013, provisional application No. 61/842,757, filed on Jul. 3, 2013, provisional application No. 61/842,756, filed on Jul. 3, 2013, provisional application No. 61/921,004, filed on Dec. 26, 2013, provisional application No. 61/920,985, filed on Dec. 26, 2013, provisional application No. 61/922,438, filed on Dec. 31, 2013, provisional application No. 61/924,092, filed on Jan. 6, 2014, provisional application No. 61/924,097, filed on Jan. 6, 2014.

(51) Int. Cl.
| | |
|---|---|
| *G06Q 20/00* | (2012.01) |
| *G06Q 20/40* | (2012.01) |
| *H04L 29/06* | (2006.01) |
| *G07F 19/00* | (2006.01) |
| *G06Q 20/32* | (2012.01) |

(52) U.S. Cl.
CPC ...... *G06Q 20/40145* (2013.01); *G06Q 20/3276* (2013.01); *G07F 19/20* (2013.01); *H04L 63/0861* (2013.01)

(58) Field of Classification Search
CPC ......... G06F 21/30; G06F 21/31; G06F 21/32; G06F 21/34; H04L 63/0861
See application file for complete search history.

(56) References Cited

U.S. PATENT DOCUMENTS

| | | | |
|---|---|---|---|
| 7,995,995 B2 | 8/2011 | Novack et al. | |
| 8,280,740 B2 | 10/2012 | Di Mambro et al. | |
| 8,380,177 B2 | 2/2013 | Laracey | |
| 8,457,367 B1 | 6/2013 | Sipe et al. | |
| 8,632,000 B2 | 1/2014 | Laracey | |
| 2005/0086683 A1 | 4/2005 | Meyerson | |

(Continued)

*Primary Examiner* — Dante Ravetti  
(74) *Attorney, Agent, or Firm* — Leason Ellis LLP

(57) ABSTRACT

Systems and methods are provided for authorizing a user in connection with a transaction at a transaction terminal. The systems and methods described herein enable a series of operations whereby a user using a mobile device can capture a code that uniquely identifies a transaction terminal. In addition the mobile device can also capture a user's biometrics, generate a biometric identifier and biometrically verify the user's identity by comparing the biometric identifier to a previously generated biometric identifier. If the user is biometrically authenticated the mobile device can generate a transaction request including, a user identifier, a mobile device identifier, and the transaction terminal code and transmit the transaction request to a system server. Based on the transaction request, the system server can further authenticate the user and/or approve the requested transaction. If the user is authenticated, the system server can instruct the terminal to advance the financial transaction.

10 Claims, 8 Drawing Sheets

(56) References Cited

U.S. PATENT DOCUMENTS

| | | |
|---|---|---|
| 2006/0251029 A1 | 11/2006 | Fritsch et al. |
| 2006/0293891 A1 | 12/2006 | Pathuel |
| 2008/0049984 A1 | 2/2008 | Poo et al. |
| 2010/0014720 A1* | 1/2010 | Hoyos et al. .......... 382/118 |
| 2011/0047384 A1 | 2/2011 | Jacobs et al. |
| 2013/0042314 A1* | 2/2013 | Kelley .......................... 726/9 |
| 2013/0081119 A1 | 3/2013 | Sampas |
| 2014/0090039 A1* | 3/2014 | Bhow, Gunjan Dhanesh ... 726/7 |
| 2014/0149293 A1 | 5/2014 | Laracey |
| 2014/0191028 A1 | 7/2014 | Laracey |

* cited by examiner

SYSTEMS AND METHODS FOR BIOMETRIC AUTHENTICATION OF TRANSACTIONS

CROSS-REFERENCE TO RELATED APPLICATIONS

The present application is related to and includes U.S. Patent Application Ser. No. 61/822,746, entitled "SYSTEM AND METHOD FOR PROVIDING BIOMETRICALLY AUTHENTICATED ACCESS USING MOBILE DEVICES" filed May 13, 2013; U.S. Patent Application Ser. No. 61/842,800, entitled "SYSTEM AND METHOD FOR PROVIDING BIOMETRICALLY AUTHENTICATED ACCESS USING MOBILE DEVICES" filed Jul. 3, 2013; U.S. Patent Application Ser. No. 61/842,739, entitled "SECURE BACK-END ARCHITECTURE SYSTEM AND METHOD" filed Jul. 3, 2013; U.S. Patent Application Ser. No. 61/842,757, entitled "SYSTEM AND METHOD FOR GENERATING A BIOMETRIC IDENTIFIER" filed Jul. 3, 2013; U.S. Patent Application Ser. No. 61/842,756, entitled "SYSTEMS AND METHODS FOR DETERMINING LIVENESS" filed Jul. 3, 2013; U.S. Provisional Patent Application Ser. No. 61/921,004, entitled "SYSTEM AND METHOD FOR DETERMINING LIVENESS" filed Dec. 26, 2013; U.S. Provisional Patent Application Ser. No. 61/920,985, entitled "SYSTEM AND METHOD FOR GENERATING A BIOMETRIC IDENTIFIER" filed Dec. 26, 2013; U.S. Provisional Patent Application Ser. No. 61/922,438, entitled "SYSTEM AND METHOD FOR BIOMETRIC PROTOCOL STANDARDS" filed Dec. 31, 2013; U.S. Patent Application Ser. No. 61/924,092, entitled "SECURE BACK-END ARCHITECTURE SYSTEM AND METHOD" filed Jan. 6, 2014; U.S. Patent Application Ser. No. 61/924,097, entitled "SYSTEM AND METHOD FOR SMARTPHONE SECURITY CASE" filed Jan. 6, 2014; U.S. patent application Ser. No. 14/201,426, entitled "SYSTEMS AND METHODS FOR DETERMINING LIVENESS" filed on even date herewith; U.S. patent application Ser. No. 14/201,499, entitled "SYSTEM AND METHOD FOR GENERATING A BIOMETRIC IDENTIFIER" filed on even date herewith which are each hereby incorporated by reference as if set forth in their respective entireties herein.

TECHNICAL FIELD OF THE INVENTION

The present invention relates to systems and methods for providing authenticated access, in particular, systems and methods for providing biometrically authenticated access using a mobile device.

BACKGROUND OF THE INVENTION

Automated teller machines (ATMs) provide an interface that allows credit card and debit card users to receive and/or deposit funds. During typical use of ATMs, and other transaction systems like a merchant point-of-sale device (POS), a user typically provides a transaction card, such as a debit card and/or credit card having account information embedded therein. The account information can include a card number, the account holder's name, and the like. To complete the transaction, the user often has to enter in a secure passcode such as a personal identification number (PIN) to authenticate the transaction.

In an typical ATM transaction the user initiates the transaction by inserting a payment card with the account information therein into the transaction terminal. The ATM transfers a transaction request to a payment network for processing. The payment network is communicatively coupled to the ATMs and various financial institution networks to facilitate processing of the ATM transactions. The payment network can route transaction requests from the ATMs to the appropriate financial institution network based on the transaction information included in the transaction request and can route transaction responses from the financial institution network to the ATMs as would be understood by those skilled in the art. Based on the transaction response, the ATM performs the service requested by the user, such as, for example, dispensing funds, accepting funds for deposit, providing an account balance, providing an account statement, and the like.

One issue with ATMs and other such secret password authentication based systems is that they are vulnerable to fraud. For example, fraudsters often obtain bank account information by attaching scanning devices to an ATM to read a transaction card and record the embedded account information, and also obtain the user's PIN number by watching or recording video of the user entering the PIN on the ATM keypad. Once the fraudster has the account information and PIN, the fraudster has access to the user's account. Similarly, other systems in which a user enters a password, PIN, log-in or other private information are similarly susceptible to fraud. For example, a fraudster can obtain a user's secure website log-in and password by watching the user input the private information on a computer.

Accordingly, there is a need for systems and methods for facilitating secure transactions, such as financial transactions that are less susceptible to fraud from capturing a user's private account information and/or secret passcodes.

As a biometric is a biological characteristic (such as a fingerprint, the geometry of a hand, Retina pattern, iris shape, etc.) of an individual, biometric techniques can be used as an additional verification factor since biometrics are usually more difficult to obtain than other non-biometric credentials. Biometrics can be used for identification and/or authentication (also referred to as identity assertion and/or verification).

Biometric identity assertion can require a certain level of security as dictated by the application. For example, authentication in connection with a financial transaction or gaining access to a secure location requires higher security levels. As a result, preferably, the accuracy of the biometric representation of a user is sufficient to ensure that the user is accurately authenticated and security is maintained. However, to the extent iris, face, finger, and voice identity assertion systems exist and provide the requisite level of accuracy, such systems require dedicated devices and applications and are not easily implemented on conventional smartphones, which have limited camera resolution and light emitting capabilities.

The challenges surrounding traditional biometric feature capture techniques, which generally require high resolution imagery, multi-spectral lighting and significant computing power to execute the existing image analysis algorithms to achieve the requisite accuracy dictated by security have made biometric authentication not widely available or accessible to the masses. Moreover, traditional biometric authentication techniques requiring dedicated devices used in a specific way (e.g., require a cooperative subject, have a narrow field of view, biometric must be obtained in a specific way) detracts from user convenience and wide-scale implementation.

Accordingly, there is a need for systems and methods with which a user's identity can be verified conveniently, seamlessly, and with a sufficient degree of accuracy, from biometric information captured from the user using readily available smartphones. In addition, what is needed are identity assertion systems and methods that, preferably, are not reliant on multi-spectral imaging devices, multi-spectral light emitters, high resolution cameras, or multiple user inputs.

SUMMARY OF THE INVENTION

Technologies are presented herein in support of a system and method for authorizing a user in connection with a transaction at a transaction terminal.

According to a first aspect, the method for authorizing a user in connection with a transaction at a transaction terminal includes the steps of receiving, by a mobile device information that uniquely identifies a transaction terminal. The information can be read by the mobile device using an associated camera or reader for capturing machine readable codes. In furtherance of the transaction, the method includes causing a camera of the mobile device to capture a plurality of images depicting at least one facial region of the user. Using the plurality of images, the mobile device generates a biometric identifier for the user and verifies the user's identity by comparing the biometric identifier to one or more previously generated biometric identifiers. In response to verifying the user's identity, the computing device also generates a transaction request that includes, a user identifier that identifies the user, a mobile device identifier that identifies the mobile device, and a transaction terminal identifier that uniquely identifies the transaction terminal. The method also includes transmitting the transaction request to a remote computing device such that the user is authorized to transact at the transaction terminal after the user identifier is verified, the mobile device identifier is verified and the transaction is verified.

According to another aspect, a method for authorizing a user in connection with a transaction at a transaction terminal, includes the steps of generating, by a remote computing device, a code that uniquely identifies a transaction terminal and causing the transaction terminal to display the code. The method also includes, receiving by the remote computing device from a mobile device over a network, a transaction request that includes: a user identifier that identifies the user, a mobile device identifier that identifies the mobile device, a transaction terminal identifier that uniquely identifies the transaction terminal; and biometric authentication information indicating whether the user has been biometrically authenticated. Using the transaction request, the remote computing device authorizes the user to transact at the transaction terminal. Authorizing the user includes verifying the user identifier, verifying the mobile device identifier, verifying that the user has been biometrically authenticated according to the biometric authentication information, and verifying the transaction according to the transaction terminal identifier and the code. In response to successful user authorization, the method includes advancing the transaction at the terminal.

According to another aspect, a system is provided for authorizing a user in connection with a transaction at a transaction terminal. The system includes one or more processors configured to interact with a camera, a communication interface and a computer-readable storage medium and execute one or more software modules stored on the storage medium. The software modules include a capture module that, when executed by the processor, configures the processor and the camera to receive information that uniquely identifies a transaction terminal and also capture a plurality of images depicting at least one facial region of the user. The software modules also includes an analysis module that configures the processor to generate, from the plurality of images, a biometric identifier that identifies the user. The software modules also includes an authentication module that configures the processor to verify the user's identity by comparing the biometric identifier to one or more previously generated biometric identifiers, and generate a transaction request in response to verifying the user's identity. The transaction request includes a user identifier that identifies the user, a mobile device identifier that identifies the mobile device, and a transaction terminal identifier that uniquely identifies the transaction terminal. In addition, the software modules includes a communication module that configures the processor and communication interface to transmit the transaction request to one or more remote computing devices and receive an authorization notification indicating whether the user is authorized to transact at the transaction terminal, wherein the user is authorized to transact at the transaction terminal after the user identifier is verified, the mobile device identifier is verified and the transaction is verified.

These and other aspects, features, and advantages can be appreciated from the accompanying description of certain embodiments of the invention and the accompanying drawing figures and claims.

DETAILED DESCRIPTION OF CERTAIN EMBODIMENTS OF THE INVENTION

Figure 1:
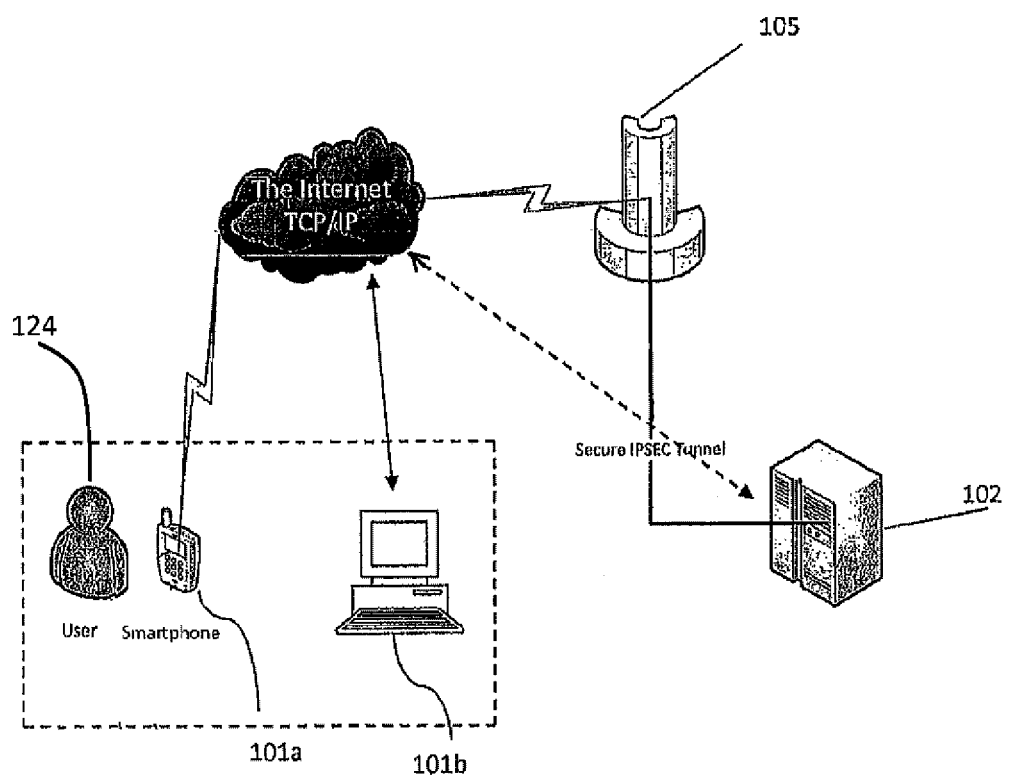
FIG. 1 is a high-level diagram of a computer system for authorizing a user in connection with a transaction at a transaction terminal in accordance with at least one embodiment disclosed herein.

By way of example only and for the purpose of overview and introduction, embodiments of the present invention are described below which concern a system and method for authorizing a user in connection with a transaction at a transaction terminal according to the user's biometric features.

The system can include a remote system server platform that communicates with enabled user devices such as mobile devices (e.g., smartphones) and communicates with transaction terminals such as ATMs. In some implementations, an ATM can be caused to display a temporary code, such as a QR code, that uniquely identifies the particular ATM. The user can continue the transaction process by capturing the displayed code with the user's mobile device camera. In order to ensure that the user is authorized to perform the transaction, the user's identity can be biometrically authenticated. For example, the user can be prompted to capture biometric information using the mobile device, say, by capturing images of the user's face with the mobile device camera. Using that information, the user can be biometrically authenticated by comparing the captured information to biometric information previously captured during an enrollment stage. If the user is biometrically authenticated, the mobile device can transmit a transaction request to the remote system server. The transaction request can include the captured code identifying the ATM, information identifying the user and the mobile device. In some implementations, the transaction request can also include transaction details, for example, a withdrawal request of $100. Based on the transaction request, the system server can further authenticate/authorize the user to conduct the transaction and can also approve any transactions requested by the user. Upon successful authentication and/or authorization, the system server can instruct the ATM to advance the financial transaction at the terminal. For example, the system server can cause the ATM to dispense funds, receive funds, or otherwise allow the user to interact with the ATM and carry out transactions at the terminal.

The systems and methods of the present application provide significant convenience for users as a function of biometrics-based access management and increased transaction security by supplementing or eliminating the need for passwords pins, tokens and the like and/or devices dedicated to storing transaction account information, such as bank cards or token key-fobs and the like. The systems and methods of the present application also maintain a history of transactions tied to the user's biometrically authenticated identity. The historical information and trends are also maintained and auditing and non-repudiation of transactions occurs based on the linkage between the mobile device, the transaction terminal and the individual account.

Although many of the examples set forth herein describe authentication of a user and authorizing the user in connection with a transaction at a transaction terminal (e.g., ATM), the invention is not so limited. It is provided that many of the principles disclosed herein are applicable to virtually any type of system requiring user authentication, such as for example, website access, physical access control, user role determination, group identification, automation, password management, or other networked secure access systems. In addition, it should be understood that user identification, user authentication, user authorization and user verification are non-limiting terms and are used interchangeably.

An exemplary system for authenticating a user in connection with a transaction at a transaction terminal 100 is shown as a block diagram in FIG. 1. In an exemplary arrangement, the system 100 includes a system server 105, a remote computing device 102, a mobile device 101a associated with a user 124 and a transaction terminal 101b.

The system server 105 can be practically any computing device and/or data processing apparatus capable of communicating with mobile devices 101a, transaction terminals 101b and other remote computing devices 102, receiving, transmitting and storing electronic information and processing requests as further described herein. System server 105 and remote computing device 102 are intended to represent various forms of digital computers, such as laptops, desktops, workstations, personal digital assistants, servers, blade servers, mainframes, and other appropriate computers and/or networked or cloud based computing systems.

In some implementations, remote computing device 102 can be associated with an enterprise organization, for example, a financial institution or any such entity that maintains user enterprise accounts (also referred to as "transaction accounts") and provides services to account holders and requires authentication of the user prior to granting access to the enterprise systems and services. By way of further example, remote computing device 102 can include payment networks such as the Visa transaction card network, by Visa Inc. of Foster City, and banking networks for processing financial transactions as would be understood by those skilled in the art.

The mobile device 101a can be any computing device and/or data processing apparatus capable of embodying the systems and/or methods described herein, including but not limited to a personal computer, tablet computer, personal digital assistant, mobile electronic device, cellular telephone or smart phone device and the like. The transaction terminal 101b is intended to represent various forms of computing devices, such as workstations, dedicated point-of-sale systems, ATM terminals, personal computers, laptop computers, tablet computers, smart phone devices, personal digital assistants or other appropriate computers that can be used to conduct electronic transactions. The mobile device 101a and/or the transaction terminal 101b can also be configured to receive user inputs as well as capture and process biometric information, for example, digital images of a user, as further described herein.

In some implementations, the system server 105, implements rules governing access to information and/or the transmission of information between computing devices that users interact with (e.g., mobile device 101a and/or transaction terminal 101b) and one or more trusted back end servers (e.g., remote computing device 102).

In some implementations, the system server can be configured to facilitate authentication of the user in furtherance of a transaction without authorizing the underlying transaction. In this manner, the system server is not required to retain the user's sensitive transaction account information used to authorize the underlying transaction, instead, the system server is configured to authenticate the user's identity at an appropriate level of security. For example, the system 100 can authenticate a user conducting a banking transaction according to the standards required by a bank and notifying the bank (e.g., remote computing device 102) that the user's identity has been authenticated. Accordingly, the exemplary systems and methods can supplement and/or replace the existing bank card/secret PIN authentication process by integrating with the existing banking infrastructure and processes without interfering with established processes for authorizing the transactions once a user's identity has been established for security purposes.

In addition to identity assertion, the system server can also implement additional security processes, including role gathering and access control, so as to facilitate authorization of the user in connection with the requested transactions or otherwise control a user's access to networked secure environments. As such, the authorization process can include determining whether the user's identity is associated with one or more transaction accounts (e.g., bank accounts). In addition, the authorization process can also include determining the user's level of access using the transaction account, for example, whether the user has the requisite permissions to transact at an ATM, or perform specific transactions, say, withdraw funds, make deposits and the like, as would be understood by those skilled in the art.

Identity assertion, role gathering, access control and other security functions of the system server 105, including auditing, security assurance and accountability are further described herein and in co-pending and commonly assigned U.S. Patent Application Ser. No. 61/622,438, entitled "SYSTEM AND METHOD FOR BIOMETRIC PROTOCOL STANDARDS" filed Dec. 31, 2013.

As further described herein, the systems and methods for authenticating a user can meet the security levels required by an enterprise system by using an API to integrate with an existing system (e.g., a financial institution's transaction processing and data management system). Accordingly, the system server 105 need not know whether the underlying system (e.g., remote computing device 102) is a Relational Database Management System (RDBMS), a Search Engine, a financial transaction processing system and the like. Accordingly, the systems and methods for facilitating secure authentication offer a "point and cut" mechanism to add the appropriate security to existing enterprise systems as well as to systems in development. In some implementations, the system architecture is a language neutral allowing REST, JSON and Secure Socket Layers to provide the communication interface between the various computing devices (e.g., 101a, 101b, 102, and 105). Further, in one or more implementations, the architecture is built on the servlet specification, open secure socket layers, Java, JSON, REST and Apache Solr. Accordingly, the disclosed systems for authenticating a user can implement open standards allowing significant interoperability.

It should be noted that while FIG. 1 depicts the system 100 with respect to a mobile device 101a, it should be understood that any number of such devices can interact with the system 100 in the manner described herein. It should also be noted that while FIG. 1 depicts the system 100 with respect to a user 124, it should be understood that any number of users can interact with the system in the manner described herein. It should also be understood that computing devices can be in direct communication with the system server 105, indirect communication with the system server 105, and/or can be communicatively coordinated with the system server 105, as will be described in greater detail below.

It should be further understood that while the various computing devices and machines referenced herein, including but not limited to mobile device 101a, transaction terminal 101b, system server 105 and remote computing device 102 are referred to herein as individual/single devices and/or machines, in certain implementations the referenced devices and machines, and their associated and/or accompanying operations, features, and/or functionalities can be combined or arranged or otherwise employed across any number of devices and/or machines, such as over a network connection or wired connection, as is known to those of skill in the art.

Figure 2A:
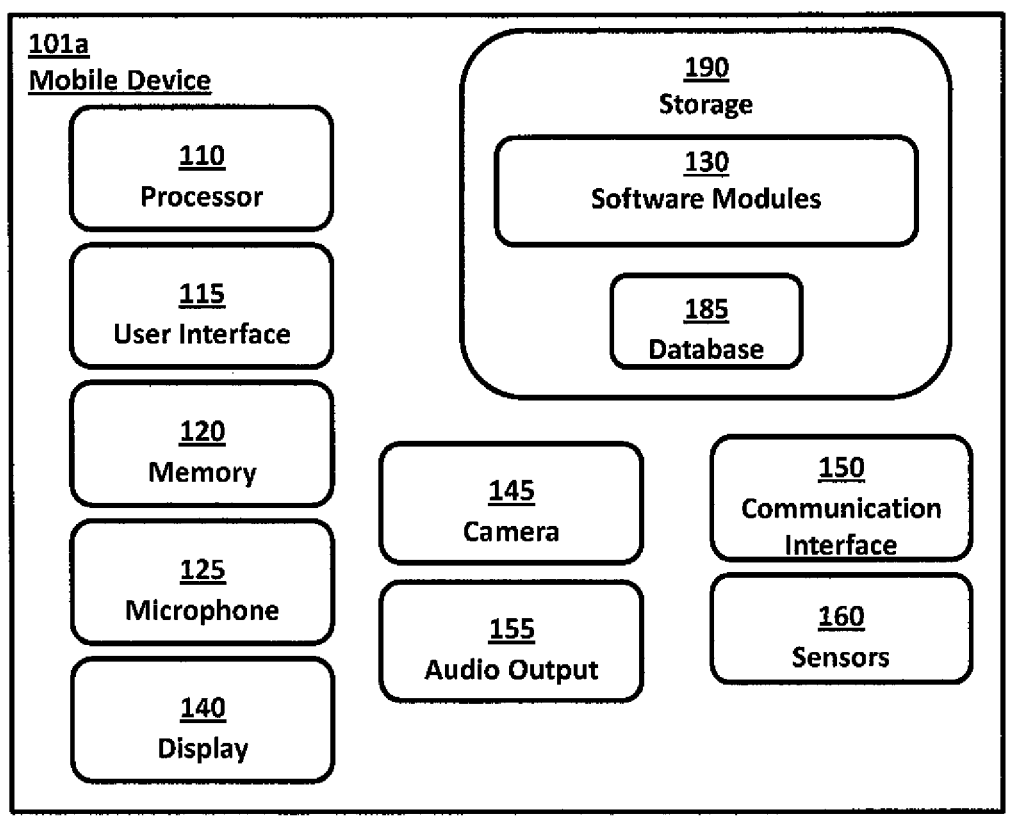
FIG. 2A is a block diagram of a computer system for authorizing a user in connection with a transaction at a transaction terminal in accordance with at least one embodiment disclosed herein.

In reference to FIG. 2A, mobile device 101a of the system for biometric authentication 100, includes various hardware and software components that serve to enable operation of the system, including one or more processors 110, a memory 120, a microphone 125, a display 140, a camera 145, an audio output 155, a storage 190 and a communication interface 150. Processor 110 serves to execute a client application in the form of software instructions that can be loaded into memory 120. Processor 110 can be a number of processors, a central processing unit CPU, a graphics processing unit GPU, a multi-processor core, or any other type of processor, depending on the particular implementation.

Preferably, the memory 120 and/or the storage 190 are accessible by the processor 110, thereby enabling the processor to receive and execute instructions encoded in the memory and/or on the storage so as to cause the mobile device and its various hardware components to carry out operations for aspects of the exemplary systems and methods disclosed herein. Memory can be, for example, a random access memory (RAM) or any other suitable volatile or non-volatile computer readable storage medium. The storage 190 can take various forms, depending on the particular implementation. For example, the storage can contain one or more components or devices such as a hard drive, a flash memory, a rewritable optical disk, a rewritable magnetic tape, or some combination of the above. In addition, the memory and/or storage can be fixed or removable.

Figure 2B:
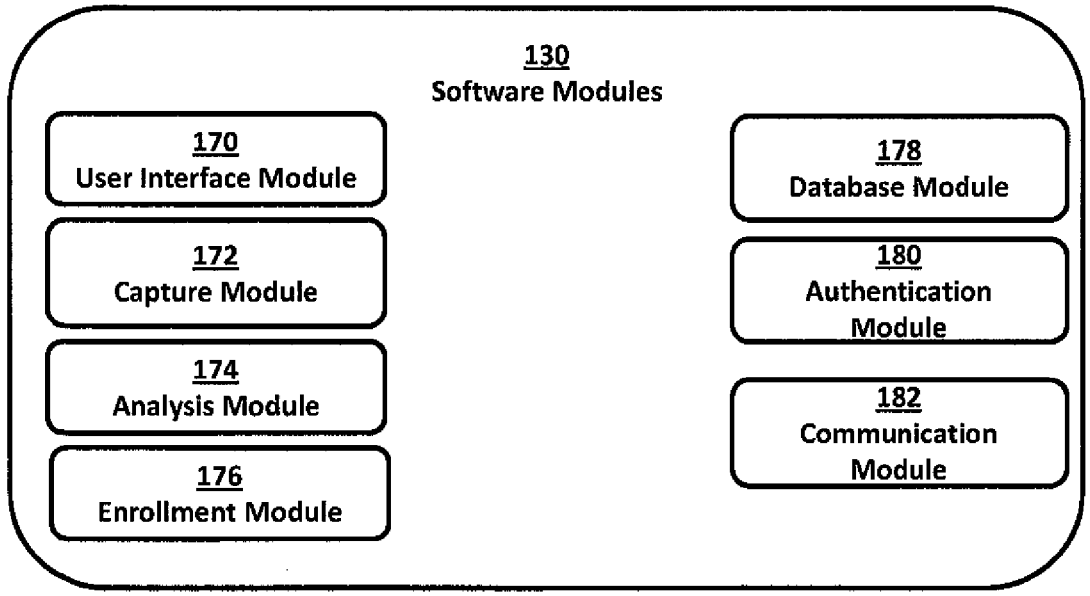
FIG. 2B is a block diagram of software modules for authorizing a user in connection with a transaction at a transaction terminal in accordance with at least one embodiment disclosed herein.

One or more software modules 130 are encoded in the storage 190 and/or in the memory 120. The software modules 130 can comprise one or more software programs or applications having computer program code or a set of instructions (referred to as the "mobile authentication client application") executed in the processor 110. As depicted in FIG. 2B, preferably, included among the software modules 130 is a user interface module 170, a biometric capture module 172, an analysis module 174, an enrollment module 176, a database module 178, an authentication module 180 and a communication module 182 that are executed by processor 110. Such computer program code or instructions configure the processor 110 to carry out operations of the systems and methods disclosed herein and can be written in any combination of one or more programming languages.

The program code can execute entirely on mobile device 101, as a stand-alone software package, partly on mobile device, partly on system server 105, or entirely on system server or another remote computer/device. In the latter scenario, the remote computer can be connected to mobile device 101 through any type of network, including a local area network (LAN) or a wide area network (WAN), mobile communications network, cellular network, or the connection can be made to an external computer (for example, through the Internet using an Internet Service Provider).

It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of the software modules 130 can be downloaded over a network to storage 190 from another device or system via communication interface 150 for use within the system for biometric authentication 100. In addition, it should be noted that other information and/or data relevant to the operation of the present systems and methods (such as database 185) can also be stored on storage. In some implementations, such information is stored on an encrypted data-store that is specifically allocated so as to securely store information collected or generated by the processor 110 executing the software modules 130. Preferably, encryption measures are used to store the information locally on the mobile device storage and transmit information to the system server 105. For example, such data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256.

In addition, data stored on the mobile device 101a and/or system server 105 can be encrypted using an encryption key generated from a user's biometric information, liveness information, or mobile device information as further described herein. In some implementations, a combination of the foregoing can be used to create a complex unique key for the user that can be encrypted on the mobile device using Elliptic Curve Cryptography, preferably at least 384 bits in length. In addition, that key can be used to secure the user data stored on the mobile device and/or the system server.

Also preferably stored on storage 190 is database 185. As will be described in greater detail below, the database contains and/or maintains various data items and elements that are utilized throughout the various operations of the system and method for authenticating a user conducting a financial transaction at a transaction terminal. The information stored in database can include but is not limited to a user profile, as will be described in greater detail herein. It should be noted that although database is depicted as being configured locally to mobile device 101a, in certain implementations the database and/or various of the data elements stored therein can, in addition or alternatively, be located remotely (such as on a remote device 102 or system server 105—not shown) and connected to mobile device through a network in a manner known to those of ordinary skill in the art.

A user interface 115 is also operatively connected to the processor. The interface can be one or more input or output device(s) such as switch(es), button(s), key(s), a touchscreen, microphone, etc. as would be understood in the art of electronic computing devices. User Interface serves to facilitate the capture of commands from the user such as an on-off commands or user information and settings related to operation of the system for authenticating a user 100. For example, interface serves to facilitate the capture of certain information from the mobile device 101 such as personal user information for enrolling with the system so as to create a user profile.

The computing device 101a can also include a display 140 which is also operatively connected to processor the processor 110. The display includes a screen or any other such presentation device which enables the mobile device to instruct or otherwise provide feedback to the user regarding the operation of the system 100. By way of example, the display can be a digital display such as a dot matrix display or other 2-dimensional display.

By way of further example, the interface and the display can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the user to interact with the device to enter data, change settings, control functions, etc. So, when the touch screen is touched, user interface communicates this change to processor, and settings can be changed or user entered information can be captured and stored in the memory and/or storage.

Mobile device 101a also includes a camera 145 capable of capturing digital images. The camera can be one or more imaging devices configured to capture images of at least a portion of the user's body, including, the user's eyes and/or face while utilizing the mobile device 101a. The camera serves to facilitate the capture of images of the user for the purpose of image analysis by the configured mobile device processor which includes identifying biometric features for (biometrically) authenticating the user from the images. The mobile device 101a and/or the camera 145 can also include one or more light or signal emitters (not shown) for example, a visible light emitter and/or infra-red light emitter and the like. The camera can be integrated into the mobile device, such as a front-facing camera or rear facing camera that incorporates a sensor, for example and without limitation a CCD or CMOS sensor. Alternatively, the camera can be external to the mobile device 101a. The possible variations of the camera and light emitters would be understood by those skilled in the art. In addition, the mobile device can also include one or more microphones 125 for capturing audio recordings as would be understood by those skilled in the art.

An audio output 155 is also operatively connected to the processor 110. The audio output can be integrated into the mobile device 101 or external to the mobile device and can be any type of speaker system that is configured to play electronic audio files as would be understood by those skilled in the art.

Various hardware devices/sensors 160 are also operatively connected to the processor. The sensors 160 can include: an on-board clock to track time of day, etc.; a GPS enabled device to determine a location of the mobile device; an accelerometer to track the orientation and acceleration of the mobile device; a gravity magnetometer for measuring the earth's magnetic field, proximity sensors for measuring distance from the mobile device to an object, RF radiation sensors for measuring radiation and other such devices for capturing information concerning the environment of the mobile device, as would be understood by those skilled in the art.

Communication interface 150 is also operatively connected to the processor 110 and can be any interface that enables communication between the mobile device 101a and external devices, machines and/or elements. Preferably, the communication interface can include but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the mobile device to other computing devices and/or communication networks such as private networks and the Internet. Such connections can include a wired connection or a wireless connection (e.g., using the 802.11 standard) though it should be understood that the communication interface can be practically any interface that enables communication to/from the mobile device.

At various points during the operation of the system for authenticating a user conducting a financial transaction 100, the mobile device 101a can communicate with one or more computing devices, such as system server 105, transaction terminal 101b and/or remote computing device 102. Such computing devices transmit and/or receive data to/from mobile device 101a, thereby preferably initiating maintaining, and/or enhancing the operation of the system 100, as will be described in greater detail below.

Figure 2C:
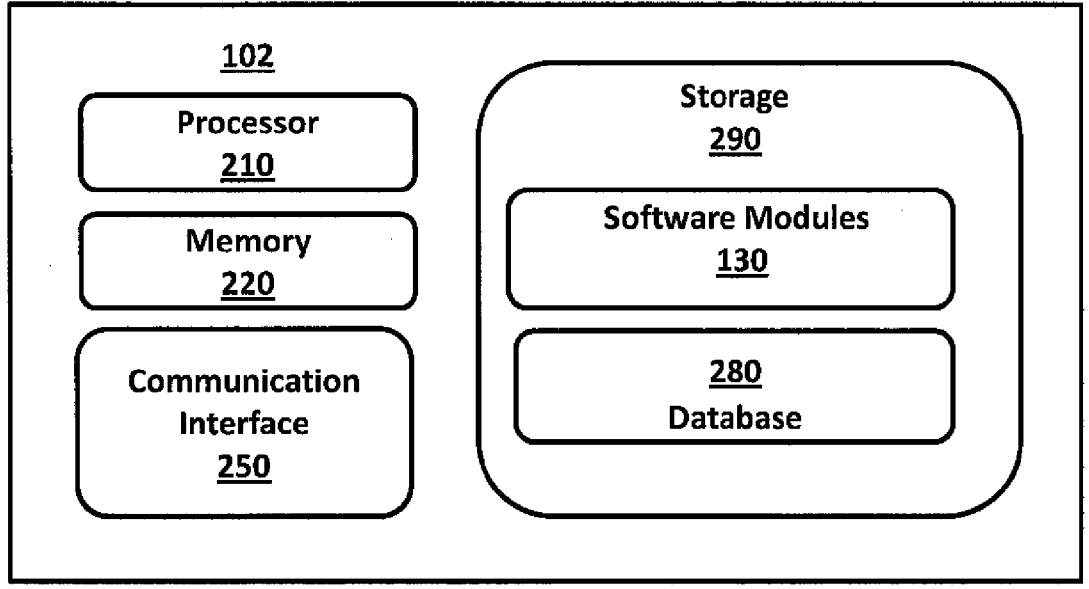
FIG. 2C is a block diagram of a computer system for authorizing a user in connection with a transaction at a transaction terminal in accordance with at least one embodiment disclosed herein.

FIG. 2C is a block diagram illustrating an exemplary configuration of system server 105. System server 105 can include a processor 210 which is operatively connected to various hardware and software components that serve to enable operation of the system for authenticating a user in connection with a transaction at a transaction terminal 100. The processor 210 serves to execute instructions to perform various operations relating to user authentication and transaction processing/authorization as will be described in greater detail below. The processor 210 can be a number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable.

One or more software modules 130 (depicted in FIG. 2B) are encoded in the storage 290 and/or in the memory 220. The software modules 130 can comprise one or more software programs or applications (collectively referred to as the "secure authentication server application") having computer program code or a set of instructions executed in the processor 210. Such computer program code or instructions for carrying out operations for aspects of the systems and methods disclosed herein can be written in any combination of one or more programming languages, as would be understood by those skilled in the art. The program code can execute entirely on the system server 105 as a stand-alone software package, partly on the system server 105 and partly on a remote computing device, such as a remote computing device 102, mobile device 101a and/or user computing device 101b, or entirely on such remote computing devices. As depicted in FIG. 2B, preferably, included among the software modules 130 are an analysis module 274, an enrollment module 276, an authentication module 280, a database module 278, and a communication module 282, that are executed by the system server's processor 210.

Also preferably stored on the storage 290 is a database 280. As will be described in greater detail below, the database 280 contains and/or maintains various data items and elements that are utilized throughout the various operations of the system 100, including but not limited to, user profiles as will be described in greater detail herein. It should be noted that although the database 280 is depicted as being configured locally to the computing device 205, in certain implementations the database 280 and/or various of the data elements stored therein can be stored on a computer readable memory or storage medium that is located remotely and connected to the system server 105 through a network (not shown), in a manner known to those of ordinary skill in the art.

A communication interface 255 is also operatively connected to the processor 210. The communication interface can be any interface that enables communication between the system server 105 and external devices, machines and/or elements. In certain implementations, the communication interface can include but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device 205 to other computing devices and/or communication networks, such as private networks and the Internet. Such connections can include a wired connection or a wireless connection (e.g., using the 802.11 standard) though it should be understood that communication interface 255 can be practically any interface that enables communication to/from the processor 210.

The operation of the system for authenticating a user in connection with a transaction at a transaction terminal 100 and the various elements and components described above will be further appreciated with reference to the method for authenticating a user conducting a financial transaction as described below, in conjunction with FIGS. 3-4 and with continued reference to FIGS. 1 and 2A-2B. The processes depicted in FIGS. 3 and 4 are shown from the perspective of the mobile device 101a as well as the system server 105, however, it should be understood that the processes can be performed, in whole or in part, by the mobile device 101a, the system server 105 and/or other computing devices (e.g., remote computing device 102 and/or transaction terminal 101b) or any combination of the foregoing.

Figure 3:
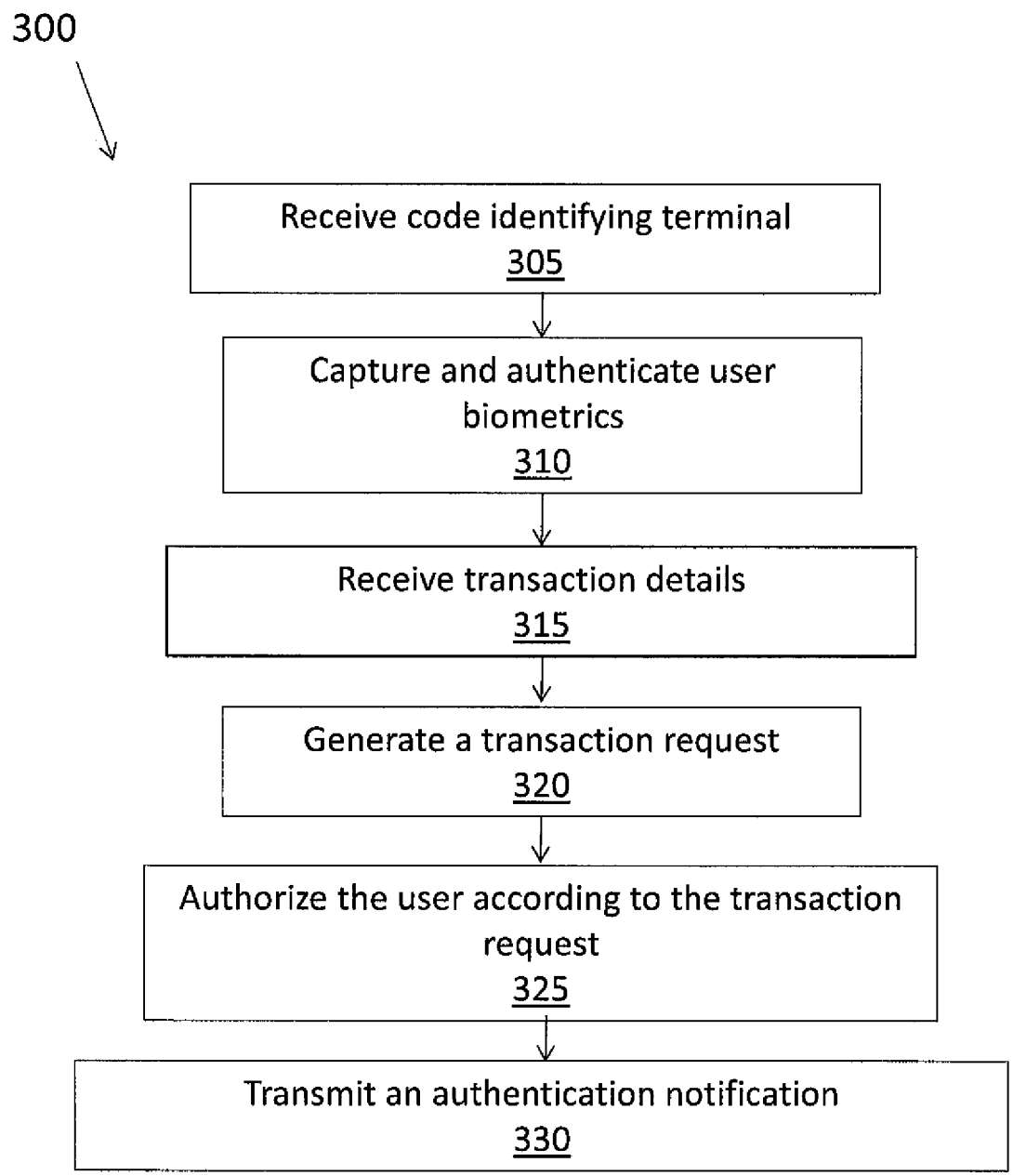
FIG. 3 is a flow diagram showing a routine for authorizing a user in connection with a transaction at a transaction terminal in accordance with at least one embodiment disclosed herein.

FIG. 3 is a flow diagram depicting an exemplary process 300 for authenticating a user in connection with a transaction conducted at a transaction terminal according to the user's biometric features. In some implementations, the exemplary process 300 occurs after an initial enrollment process (also referred to as "genesis") in which the user 124 is enrolled with the system server 105. The enrollment process verifies the user's identity to ensure that the user is who they say they are and can also specify the manner in which the user 124 and the mobile device 101a are identified to the system server 105 in subsequent communication sessions, for example, user authentication sessions. In addition, enrollment can create a user profile which associates the user 124 with user devices (e.g., user's mobile device 101a and/or the user computing device 101b) and with one or more transaction accounts, for example, a bank account which can only be accessed after user authentication.

Figure 4:
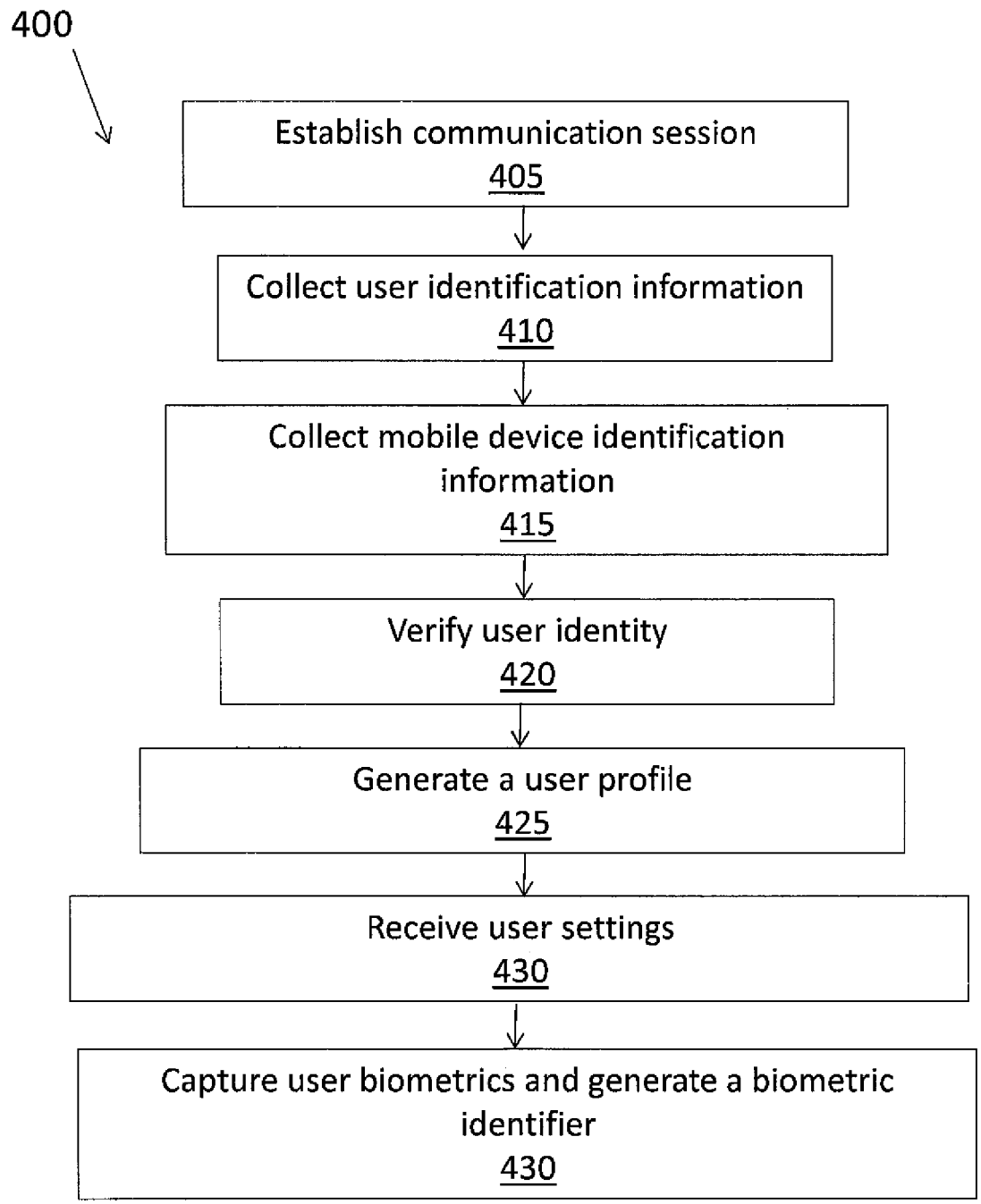
FIG. 4 is a flow diagram showing a routine for enrolling a user in connection with a transaction at a transaction terminal in accordance with at least one embodiment disclosed herein.

Turning briefly to FIG. 4, which depicts an exemplary process 400 for enrolling a user according to certain embodiments of the invention, the process begins at step 405, where an initial communication session is established between the mobile device 101a and the system server 105. In some implementations, communications between the mobile device and system server can be established using 2-way Secure Socket Layers (SSL) established on a top of 1-way SSL communication. More specifically, the mobile device processor 110, which is configured by executing one or more software applications, including, preferably, the communications module 182 and the enrollment module 176, can transmit an API call to the system server 105 and establish a 1-way SSL communication session with the system server 105 in order to encrypt the communications. The API call can also include a private 2-way SSL key so as to establish a 2-way SSL secure communication environment. In some implementations, the mobile device can transmit a pre-loaded 2-way SSL certificate and an API key that is unique to the mobile device client application. The pre-loaded certificate and key can be single use instances that are stored when the client application is stored into memory.

Figure 5A:
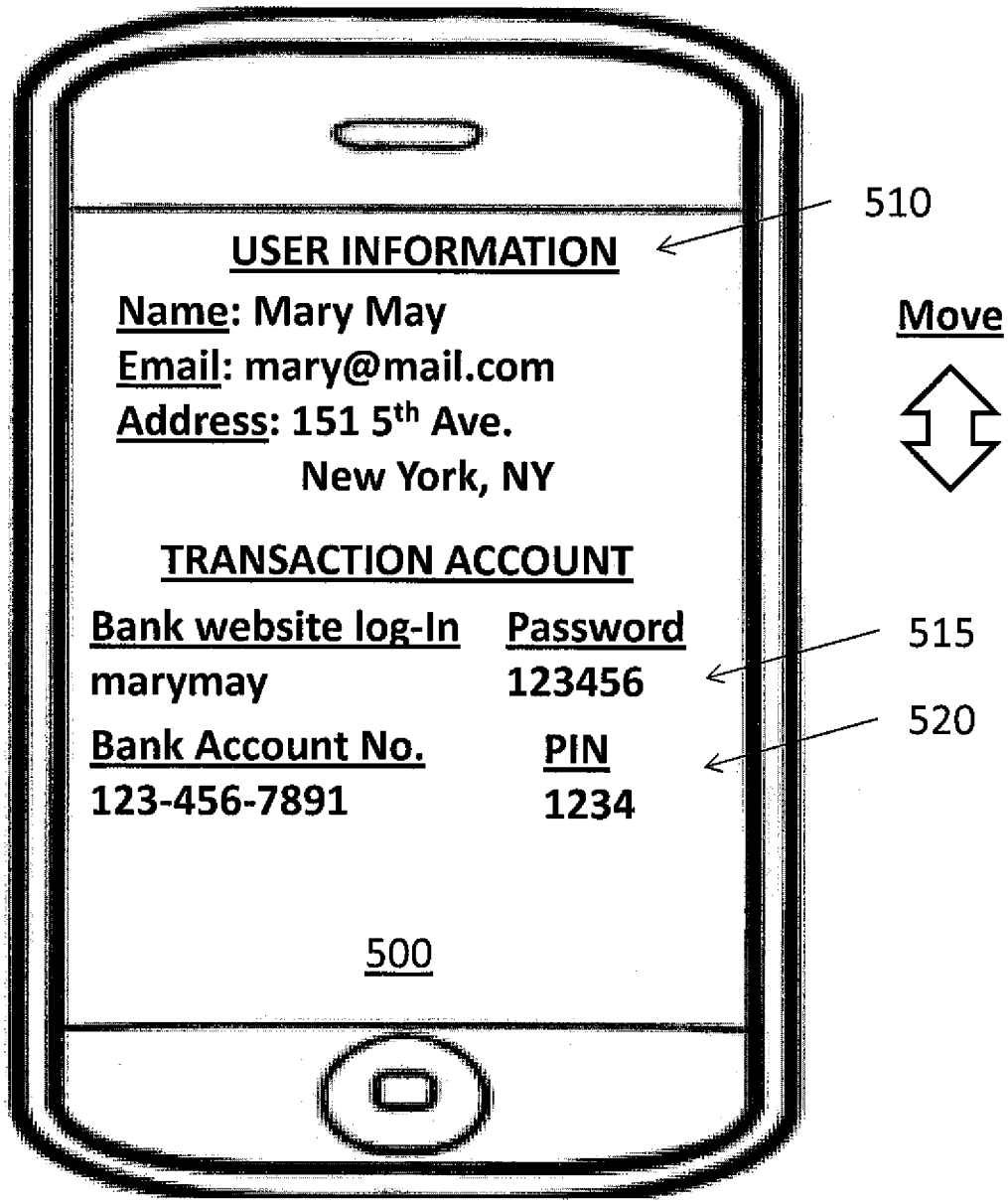
FIG. 5A is a screenshot of an exemplary user interface in accordance with at least one embodiment disclosed herein.

Then at step 410, the mobile device 101a collects user identification information. More specifically, the mobile device processor 110, which is configured by executing one or more software modules 130, including, preferably, the enrollment module 176 and the user interface module 170, can prompt the user to input the user identification information and receive the user inputs via the user interface 115. The user identification information can include information about the user's identity (e.g., name, address, social security number, etc.). For example, as shown in FIG. 5A, the mobile device display 500 can prompt the user to input such personal information about the user's identity 510. In some implementations, some or all of the information can be gathered automatically from memory of the mobile device 101a or from a remote computing device.

In addition, the mobile device can prompt the user to input information about one or more transaction accounts that the user desires to access using the system 100. For example, the user can enter pre-existing log-in and passwords 515 associated with the user's various transaction accounts (e.g., online banking accounts, website log-ins, enterprise account passwords and the like) or actual transaction account information 520 (e.g., account numbers, routing numbers, debit/credit card numbers, PINs, expiration dates, etc.) as shown in FIG. 5A. In some implementations, the configured mobile device processor and/or the system server 105 can automatically obtain some or all of such information directly from the enterprise organizations associated with the transaction accounts after verifying the user's identity according to the user identification information provided by the user.

Then at step 415, mobile device identification information is collected. Mobile device identification information can include but is not limited to at least a portion of the DeviceID, AndroidID, IMEI, CPU serial number, GPU serial number and other such identifiers that are unique to the mobile device. More specifically, the mobile device processor 110, which is configured by executing one or more software modules 130, including, preferably, the enrollment module 176, can query the various hardware and software components of the mobile device 101a to obtain respective device identification information. Using the mobile device identification information the configured mobile device processor or the system server can generate one or more mobile device identifiers that uniquely identify the mobile device as further described herein.

Then at step 420, the user's identity is verified. More specifically, the mobile device processor 110, which is configured by executing one or more software modules 130, including, preferably, the enrollment module 176 and communication module 182, can transmit the user identification information and the mobile device identification information to the system server 105 for verification and generation of a user profile by the system server 105.

In some implementations, the system server 105 can verify the user's identity according to transaction account and password information that is already associated with one or more existing transaction accounts associated with the user and stored on the system server or on a secure data store that is accessible by the system server. For example, if the system server is integrated with a bank's existing security systems, the user can be identified by, say, an existing account number and pin number or a log-in and password. In addition or alternatively the user's identity can be verified using third-party verification services, for example, the Acxiom Personal Information Verification System by Acxiom Corp. of Little Rock, Ark.

Then at step 425, if a user's identity is verified, a user profile is generated and stored. The user profile can include one or more pieces of user identification information and mobile device identification. In addition the user profile can include information concerning one or more of the user's transaction accounts as well as settings that can be used to guide the operation of the system 100 according to the user's preferences.

In some implementations, the system server 105 can generate a unique identifier for the user (a "userId") and an associated mobile device identifier (a "mobileId") and store the identifiers in a clustered persistent environment so as to create the profile for the user. The userId and mobileId can be generated using one or more pieces of the user identification information and mobile device identification information, respectively. It should be understood that additional user identification information and mobile device identification information can also be stored to create the user profile or stored in association with the user profile.

In addition, the userId and associated mobileId can be stored in association with information concerning one or more transaction accounts described at step 415. In some implementations, the specific transaction account information can be stored on the system server 105 thereby enabling the system server to authorize all or part of the requested transactions on behalf of the user and the enterprise organization. In addition or alternatively, the user profile can be associated with a transaction account using, for example, an identifier (e.g., a site ID or global unique identifier, etc.) or other such pointer to a secure datastore storing the sensitive transaction account information, say, the remote computing device 102 operated by an enterprise organization. Accordingly, the system server 105 is not required to store sensitive transaction account information, and, as further described herein, the system server 105 can forward transaction requests to the appropriate enterprise organization for processing and/or query the secure datastore to gather the necessary information for processing the transaction request.

At this juncture, it can be appreciated that the userId can be used to map the user profile to the user's legacy enterprise accounts. In addition, the mobileId ties the device to a user profile. In some implementations, the userIds are a convention, whereas, the mobileIds are mandatory because the mobileId alone can link the user 124 and mobile device 101a pair to the user profile maintained by the system server 105 and/or the user's transaction accounts. Moreover, any additional information included in the user profile can be used for non-repudiation or provenance purposes by the system server 105 in future authorization requests.

It can be appreciated that user profiles can be created by the system server 105 and/or the mobile device 101a. Moreover, one or more instances of a user profile can be stored on various devices (e.g., system server 105, mobile device 101a, remote computing device 102, or transaction terminal 101b). In addition, the information included in the various instances of the user's profiles can vary from device to device. For example, an instance of the user profile which stored on the mobile device 101a can include the userId, mobileId, user identification information and sensitive information concerning the user's transaction accounts, say, account numbers and the like. By way of further example, the instance of the user profile stored by the system server 105 can include the userId, mobileId, other unique identifiers assigned to the user and information that identifies the user's transaction accounts but does not include sensitive account information.

In some implementations, generating the user profile by the system server 105 can also include generating a private key, say, a unique 2-way SSL certificate using the user identification information, which can include the information concerning the user's transaction account(s), and the mobile device identification information. The generated private key can also be transmitted back to the mobile device 101a for storage in the mobile device. Accordingly, the generated key can be used for subsequent communications in conjunction with identity assertion sessions.

For example, the genesis phase can link the information that identifies the user (e.g., userId, SSN, email, or other user identifiers) to a Common Name (CN) which can be the particular manner in which the particular user is uniquely identified by the system server 105 and/or legacy enterprise account systems in the two way secure socket layers key. Accordingly, the genesis phase can also link legacy enterprise accounts associated with the user (e.g., the user's bank account) with the user identity maintained by the system server 105.

The private key is generated on the system server 105 and links the mobile device 101a (e.g., mobileId) and user (e.g., userId) pair to the user identity (e.g., user identifier, common name, etc.) that will be used for subsequent communication.

The identity as asserted through the 2-way Secure Socket Layer key can be maintained for all communication. This key is encoded with a password known to only the device being used during enrollment, which in this example is the mobile device 101a. In addition, the key is programmatically placed in the key store on the mobile device 101a. It is the only mechanism allowing the identity and links to the genesis phases. No human or device knows the password used to encrypt the 2-way SSL key. Accordingly, the mobile device 101a, using the private key, has an identity to offer in subsequent communications. It can be appreciated that each enabled mobile device associated with a user can have a unique key that can be linked to the same user profile enabling the use of multiple devices in the same manner. In addition or alternatively, separate user profiles can be established and maintained for each user-device pair independently or in a linked fashion. It can also be appreciated that, similarly, multiple users can use the same device(s) which correspond to individual user profiles or joint user profiles or otherwise linked user profiles.

Accordingly, as a result of genesis/enrollment, a user profile is created which associates the user 124, the mobile device 101a and one or more transaction accounts. In addition, the mobile device 101a can be provided with information (e.g., a unique user identifier and mobile device identifier and/or unique keys) for identifying the user 124 and mobile device 101a in subsequent communications, say, identity assertion sessions.

Then at step 430, user settings are received. Settings include preferences and rules defined by the user for guiding the operation of the system 100. In some implementations, during the enrollment process or at any point thereafter, the mobile device 101a can prompt the user to input settings and associate those settings with one or more of the user's transaction accounts. The settings can be stored by the mobile device or the system server 105 or a combination of the foregoing.

For example and without limitation, the user can specify default transaction accounts thereby configuring the mobile device 101a and/or the system server 105 to select transaction accounts and/or process transactions efficiently. By way of further example, a user can specify rules to control use of certain accounts, say, causing the system server 105 to prevent certain types of transactions, cause a notification to be provided to the user or implement additional security measures to ensure approved account usage.

In some implementations, the user defined settings can cause the system 100 to carry out various transactions automatically, or with fewer user inputs. For example, a user can specify that when conducting a transaction at an ATM, she typically wishes to withdraw a prescribed amount of cash from a default transaction account. Accordingly the system 100 can automatically conduct the transaction by applying the user defined settings when a transaction at an ATM is initiated without requiring the user to provide or confirm the transaction account and transaction details.

In some implementations, a user can also set one-time transaction rules in advance of conducting a transaction at a terminal. For example, the user can specify that the next time the user initiates a transaction at a particular bank's ATM, the user desires to deposit a check for $500 into the user's savings account held at that bank. In this manner, the user can queue a number of different transactions to be carried out automatically by the system 100.

It should be understood that the described settings are presented as non-limiting examples, and that a wide variety of settings can be used to control how transactions are conducted by the system 100 and how the user interacts with the system 100.

Then at step 435, the user's biometrics features are captured and one or more biometric identifiers are generated using the mobile device 101a. More specifically, the mobile device processor 110, which is configured by executing one or more software modules 130, including, the enrollment module 176, the analysis module 174, the user interface module 170, and the biometric capture module 172, can prompt the user to capture the user's biometric information. The configured processor can also analyze the biometric information, identify the user's biometric features and generate one or more biometric identifiers characterizing the user's biometric features as further described herein. In addition, one or more biometric identifiers can be stored to complete the enrolment stage. In some implementations, one or more biometric identifiers can be stored locally on the mobile device 101a such that the mobile device can perform the biometric authentication process. In addition or alternatively, one or more biometric identifiers can be stored on a remote computing device (e.g., system server 105) enabling the remote computing device to perform biometric authentication of the user as further described herein.

Figure 5B:
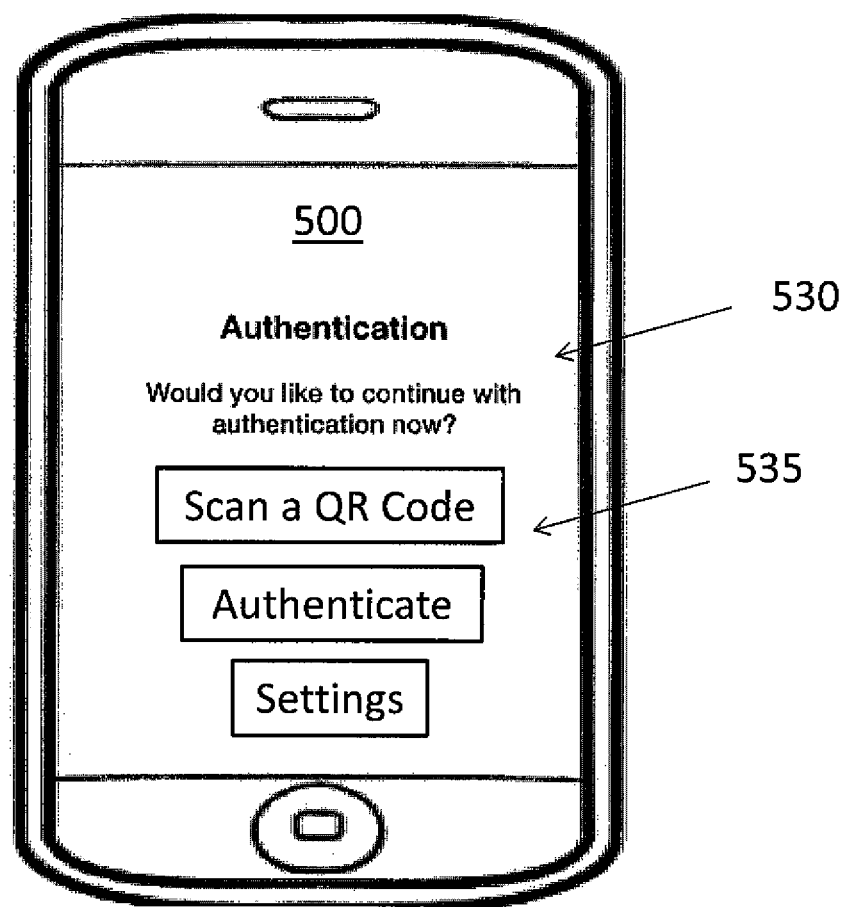
FIG. 5B is a screenshot of an exemplary user interface in accordance with at least one embodiment disclosed herein.

FIG. 3 depicts an exemplary process 300 for authorizing a user in connection with a financial transaction at a transaction terminal according to the user's biometric features. In some implementations, the financial transaction can be commenced by receiving a user input at the mobile device 101a. For example, the user can launch the client application which displays a prompt 530 on the touchscreen 500 of the mobile device requesting the user to input whether they would like to continue authentication using virtual buttons 535, as shown in FIG. 5B. In addition or alternatively, the transaction can be commenced automatically by the mobile device 101a, the system server 105 or the transaction terminal 101b.

Figure 5C:
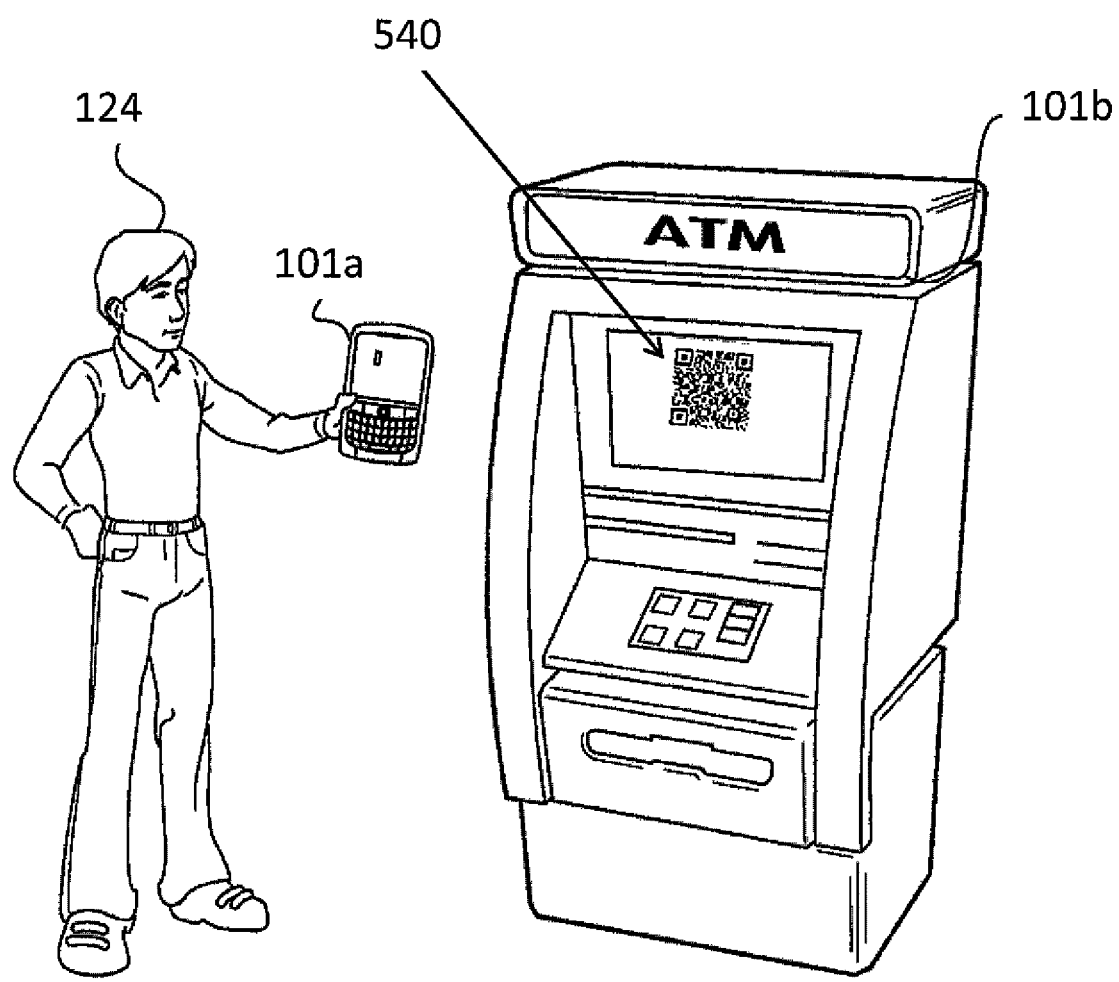
FIG. 5C is a high-level diagram of a computer system in accordance with at least one embodiment disclosed herein.

The process begins at step 305, where the mobile device processor 110, which is configured by executing one or more software modules 130, including, the authentication module 180 and the user interface module 170 captures a code identifying the transaction terminal 101b. For example, the user can be prompted to point the mobile device camera 145 at a QR code image displayed by the transaction terminal such that the mobile device camera can capture an image of the code. FIG. 5C depicts a transaction terminal 101b displaying the code as a QR code 540 such that the user 124 can capture the code using the mobile device 101a. By way of further example, the code can be an RFID signal that is transmitted by the terminal for reading by the mobile device using an RFID reader when the user is in proximity to the terminal. It can be appreciated that the code can be any machine readable signal (e.g., a machine-generated electrical, optical, or electromagnetic signal) that is generated to encode information for receipt by a suitable receiver apparatus.

Preferably, the code is a temporary code that changes at defined intervals. In some implementations, the code can be output by the transaction terminal 101b for a pre-defined duration, for example, between 1 and 10 seconds, and changes at such intervals. In addition, the code can be pseudo-randomly generated such that each code displayed is unique. In addition, the code can also include information such as a time and date stamp, a location of the terminal and other such information concerning the transaction terminal. The unique, randomly-generated codes and limited output duration is a security measure to ensure that each code is, effectively, a single use code and cannot be captured and re-used once it expires in an attempt to overcome security measures by a fraudster.

In addition, additional security measures or checks can be implemented by the system server 105 to ensure that the codes are single use codes and cannot be associated with multiple transaction attempts. In some implementations, once the system server receives a transaction request using a code identifying a particular transaction terminal, the system server can decline any ensuing transaction request that includes the same code. For example, if another user captures the same code while the first user is at the terminal, the first-in-time transaction request can be processed and the other user is prevented from conducting a transaction using the same code. In addition or alternatively, after receiving a transaction request identifying the particular transaction terminal from a first user, the system server can decline any other user transaction requests identifying the transaction terminal for a prescribed period of time, irrespective of whether the ensuing transaction requests identify the transaction terminal using a new code or previously displayed code. In some implementations, the system server can also deny any transaction request if multiple requests are received using the same code, or prompt the user to capture additional codes or perform other authentication steps to ensure that the transaction is being conducted at the particular terminal with the right user.

It should be understood that the codes can be generated by the transaction terminal 101b, the remote computing device 102, and/or the system server 105 or a combination of the foregoing. Moreover, each code can be stored temporarily or persistently on any such computing devices. For example, the code can be generated by the system server 105, transmitted to the particular transaction terminal 101b for output and stored on the system server until a new code is transmitted to the transaction terminal. By way of further example, if the code is used to conduct a financial transaction at the transaction terminal, the code can be stored persistently, say, in association with a record of the transaction.

At step 310, the mobile device 101a captures at least the user's biometric information and authenticates the user according to the biometric information. The biometric authentication step verifies that the individual who is interacting with the mobile device 101a is a user that has been previously enrolled with the system 100.

In some implementations, the mobile device processor 110, which is configured by executing one or more software modules, including, the authentication module 180, the user interface module 170, the analysis module 174 and the biometric capture module 172, can capture biometric information in the form of images of the user's eyes, periocular region and face or any combination of the foregoing (collectively referred to as the "Vitruvian region") using the camera 145.

In addition the configured processor can subsequently generate a biometric identifier characterizing the user's biometric features. Using the generated biometric identifier, the user's identity can be authenticated by comparing the biometric identifier to a stored biometric identifier that was previously generated during the enrollment process. It should be understood that the biometric authentication step is not limited to using the exemplary Vitruvian biometric identifier and can utilize any number of alternative biometric identifiers generated according to known and unknown biometric identification modalities (e.g., iris, face, voice, fingerprint, and the like).

In some implementations, the configured mobile device processor 110 can also capture information indicative of the user's "liveness" and determine whether the captured information is indicative of a live subject so as to prevent erroneous authentication caused by spoofing. A user's liveness can be determined based on biometric information and non-biometric information. For example and without limitation, non-machine-vision based information can include a time received from an on-board clock, a location received from GPS device, how far from the user's face the camera is positioned during image capture calculated from imagery or other on-board proximity measuring devices, the orientation of the mobile device and acceleration of the mobile device received from an accelerometer, RF radiation detected by an RF detector, gravity magnetometers which detect the Earth's magnetic field can be used to determine the 3-dimensional orientation in which the phone is being held, light sensors which measure light intensity levels.

Accordingly, during authentication sessions, the current non-computer-vision based data collected by the processor 110 can be analyzed and/or compared to the user's established behavioral traits. For example, current time and location can be compared to the user's time and location based behavioral patterns to determine if any abnormal behavior is exhibited. By way of further example, the "swing" or acceleration of the mobile device can be compared to a pattern identified during enrollment and multiple authentication sessions to identify abnormal behavior. By way of further example, the device orientation or distance from the user's face can be similarly compared to established patterns. By way of further example, an RF radiation signature for the user can be compared to a baseline RF signature established during enrollment to identify abnormal RF radiation levels suggesting the use of video screens to spoof the system.

By way of non-limiting example and without limitation, systems and methods for capturing user biometric information, biometric authentication and determining liveness are described herein and in co-pending and commonly assigned U.S. Patent Application Ser. No. 61/822,746, U.S. Patent Application Ser. No. 61/842,800, U.S. Patent Application Ser. No. 61/842,739, U.S. Patent Application Ser. No. 61/842, 757, and U.S. Patent Application Ser. No. 61/842,756. It should be understood that any number of biometric authentication and liveness determination techniques and applications can be employed in accordance with the disclosed embodiments.

In some implementations, the biometric authentication and liveness determination is performed by the mobile device 101a, such that the system server 105 is not required to receive, process or store the user's sensitive biometric information. However, in addition or alternatively, biometric authentication and liveness determination can be performed by remote computing devices, for example, system server 105 or remote computing device 102.

Moreover, it should be understood that the user can be biometrically authenticated before or after capturing the code associated with the transaction terminal 101b. In addition, the customer can be prompted to biometrically authenticate and/or capture the code displayed by the transaction terminal 101b at multiple stages during a transaction to provide additional security checks. Similarly, the user can also be prompted to also enter additional information into the mobile device 101a or the transaction terminal 101b while conducting the financial transaction.

At step 315, the mobile device processor 110, which is configured by executing one or more software modules, including, the user interface module 170, receives transaction details from the user via the user interface 115. The transaction details include information concerning the transaction(s)

that the user wishes to perform at the transaction terminal 101b. In some implementations, transaction details can include, for example, a transaction type (e.g., withdrawal, deposit, balance inquiry, etc.) a transaction amount, a selection of a particular transaction account for conducting the transaction and the like. The transaction details can also include one or more pre-defined settings or rules input by the user in advance of the financial transaction as described above.

It should be understood that transaction details need not be received from the user via the mobile device 101a. For example, the identification of the transaction terminal 101b and the user's biometric authentication can provide sufficient information for the system server 105 to authenticate the user and cause the transaction terminal 101b to advance the transaction as further described herein. By way of further example, transaction details can be received by the transaction terminal 101b and subsequently transmitted by the transaction terminal to the system server 105.

At step 320, the mobile device processor 110, which is configured by executing one or more software modules 130, including preferably, the authentication module 180 and the communication module 182, generates a transaction request and transmits the transaction request to the system server 105. In some implementations, the transaction request can include the transaction details, information derived from the captured code; information derived from the user identification information (e.g., the userId assigned to the user during enrollment); information derived from the mobile device identification information (e.g., the mobileId assigned to the mobile device during enrollment), and information indicating whether the user has been biometrically authenticated.

In some implementations, the mobile device 101a transmits the transaction request as a 1-way SSL API call to the system server 105. The transaction request can also include a private key generated during the enrollment process thereby establishing a 2-way SSL secured communication session between the mobile device 101a and the system server 105.

It should be understood that the information included in the transaction request can be transmitted in any number of separate transmissions. Similarly, the processing of the transaction request as further described at step 325 can be performed in any number of steps. In some implementations, the system server 105 can uses a two-step mechanism to verify user biometric authentication. For example, after the genesis phase, the mobile device has a 2-way SSL Key in its key store and the mobile device uses the key automatically (per a variety of specifications on SSL) to identify the device for all future communication. The 2-Way SSL notifies the system server 105 who is attempting to work as the biometric authentication systems/methods authenticate that identity through to a result. The mobile device then sends the result to the system server 105 as the final stage of the biometric authentication process.

Then at step 325, the system server 105 authorizes the user to transact at the transaction terminal according to the transaction request. In some implementations, the step of authorizing the transaction can include verifying that an authorized user operating an authorized mobile device is conducting the financial transaction. More specifically, the system server 105 can cross-reference the user identified by the transaction request with database of user profiles to determine whether the user is associated with a user profile and is therefore enrolled with the system 100. In addition the system server can determine whether the mobile device identified by the transaction request is also associated with the user's profile. In addition, the step of authorizing the user to transact can also include determining, by the system server 105, whether the transaction request is indicative of the user having been biometrically authenticated. In addition, the step of authorizing the user to transact at the terminal can also include determining whether the captured code identifying the transaction terminal is a valid code, for example, whether the code corresponds to a code that is currently being displayed by the transaction terminal or was recently displayed by the transaction terminal identified by the code, or has not been used in conjunction with a previously received transaction request.

In some implementations, the step of authorizing the transaction can also include determining, by the system server 105, whether the user's profile identifies one or more transaction account(s) enabling the user to conduct the financial transaction specified in the transaction details. For example, the system server can determine whether a transaction account identified in the user profile matches a financial transaction account identified in the transaction details.

In some implementations, authorizing the transaction request can also include authorizing all or part of the financial transaction specified in the transaction details based on the user's profile, the transaction details and the code identifying the transaction terminal 101b. More specifically, the system server 105 can query one or more defined data stores to gather any roles (e.g., access permissions, rules etc.) associated with the one or more transaction accounts identified in the user profile and/or identified in the transaction details to determine whether the user can perform the requested transaction. In addition, the system server can also gather roles associated with the transaction terminal 101b identified by the code to determine whether the requested transaction can be conducted at the transaction terminal. Based on the so gathered roles and the transaction details, the system server can determine whether the user is authorized to conduct the transaction at the transaction terminal 101b.

In addition, in some implementations, the system server 110 can also store information in connection with each communication and transaction, for example, transaction information including the user's mobile device identifier ("mobileId"), the amount, the account number for the bank, the transaction terminal identifier, and the date/time of the transaction and the like. Accordingly, the systems and methods of the present application can maintain a history of transactions tied to the user's biometrically authenticated identity. The historical information and trends are also maintained and auditing and non-repudiation of transactions occurs based on the linkage between the mobile device, the transaction terminal and the individual user's profile and transaction accounts.

Then at step 330, the system server 105 transmits an authorization notification indicating whether the user has been authorized to conduct the transaction at the transaction terminal. The authorization notification can be transmitted to the transaction terminal 101b, thereby advancing the transaction at the terminal in response to a successful authorization or denying the transaction in response to unsuccessful authentication. It should be understood that the authorization notification can be transmitted directly to the transaction terminal 101b or indirectly via a remote computing device 102, say, a banking network associated with the transaction terminal 101b.

In some implementations, if the system server 105 is configured to authenticate the user and not authorize the requested transaction, the authorization notification can simply notify the transaction terminal 101b that the user was successfully authenticated. The authorization notification can also pass information included in the transaction request to the banking network and/or transaction terminal 101b enabling the banking network or terminal to further process the financial transaction accordingly.

In some implementations, if the system server is configured to authorize all or part of the requested transaction, the authorization notification can provide specific instructions to the transaction terminal 101b for advancing the transaction. For example, the authorization notification can instruct the transaction terminal to complete the requested financial transaction (e.g., dispense cash, receive a deposit, etc.), display options in furtherance of the transaction (e.g., selections to withdraw cash, transfer funds, check balance, etc.) and the like, as would be understood by those skilled in the art.

In some implementations, an authorization notification can also be transmitted to the mobile device 101a prompting the user to conduct one or more steps of the financial transaction using the mobile device 101a. For example, the system server 105 can cause the mobile device 101a to present the user with various options, receive the user's selections. The system server 105 can process the user inputs and cause the financial transaction to advance accordingly at the transaction terminal 101b. In this manner the user can interact with either the mobile device 101a or the transaction terminal 101b (or a combination thereof) to perform the financial transaction.

In the event of a user not being authenticated, the system server 105 can also cause the terminal 101b and/or the mobile device 101a to notify the user with an error message and can prompt the user to re-authenticate the user's biometrics or re-enter the transaction details. Alternatively, the transaction can be canceled and the system server can cause the user to repeat one or more steps of the process 300 or variations thereof.

It should be appreciated that more or fewer operations can be performed than shown in the figures and described herein. These operations can also be performed in a different order than those described herein. It should also be understood that one or more of the steps can be performed by the mobile device 101a and/or on other computing devices (e.g. user device 101b, system server 105 and remote computing device 102).

It should be noted that although much of the foregoing description has been directed to systems for processing financial transactions at an ATM, the computing devices, networks and the transaction processing steps are presented as a non-limiting, exemplary environment in which the systems and methods disclosed herein can be employed. It can be appreciated that the arrangement of computing devices and transaction processing steps can vary according to the particular type of transaction, as would be understood by those skilled in the art.

At this juncture, it should be noted that although much of the foregoing description has been directed to systems and methods for securely authenticating a financial transaction at a transaction terminal, the systems and methods disclosed herein can be similarly deployed and/or implemented in scenarios, situations, and settings far beyond the referenced scenarios. It can be readily appreciated that system for authenticating a financial transaction at a transaction terminal can be effectively employed in practically any scenario in which an event is being organized. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for authenticating a financial transaction at a transaction terminal. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, as set forth in each and any of the following claims.

What is claimed is:

1. A method for authorizing a user in connection with a transaction conducted at a transaction terminal, the method comprising:
   generating, by a computing device, independent of the transaction, a code, that is valid for a pre-defined duration and is unique to a transaction terminal;
   accessing, by the computing device, a computer readable storage medium that includes a plurality of user profiles; wherein each user profile is associated with a respective user and a respective mobile device;
   receiving, by a computing device, a transaction terminal identifier;
   associating, by the computing device, the generated code with the received transaction terminal identifier for at least the pre-defined duration;
   storing, by the computing device, the associated code;
   transmitting, by the computing device, the generated code, to the transaction terminal over a network for output by the transaction terminal;
   receiving, by the computing device, over a network, a transaction request wherein the transaction request includes: identification information associated with the user and the mobile device, a biometric authentication status, and a code output by the transaction terminal and captured by the mobile device ("received code");

authorizing, by the computing device, based on the received transaction request, the user to conduct the transaction at the transaction terminal, wherein the authorizing step comprises:

verifying, by the computing device, that the received identification information corresponds to a user profile among the plurality of user profiles stored in the storage;

determining, by the computing device, based on the received biometric authentication status, that the user has been biometrically authenticated by the mobile device, and validating, by the computing device, the received code by determining that the received code corresponds to the stored associated code and determining that the stored associated code is valid; and creating, by the computing device in the storage, a record of the authorized transaction that includes the validated received code, the verified identification information and one or more details of the transaction including the transaction terminal identifier;

invalidating, by the computing device, the stored associated code;

generating, by the computing device, a new code that is valid for the pre-defined duration and is unique to the transaction terminal;

transmitting, by the computing device, to the transaction terminal that sent received code, the new code for output by the transaction terminal, and transmitting, by the computing device, to the transaction terminal, an authorization notification that advances the transaction at the transaction terminal.

2. The method of claim 1, further comprising:
identifying, by the computing device, based on the received code, the transaction terminal associated with the stored code;
identifying, by the computing device, based on the received code, one or more remote computing devices associated with the identified transaction terminal; and
transmitting by the computing device, to the one or more remote computing devices, an authorization notification identifying the transaction terminal and the authorized user.

3. The method of claim 2, wherein the step of generating the record further comprises:
generating a unique identifier ("sessionID") using the received code;
storing the sessionID in the storage in association with the user profile and transaction details including at least the transaction terminal identifier; and
wherein the authorization notification includes the sessionID.

4. The method of claim 1, further comprising:
determining that the received code has not been previously received from a mobile device in connection with another transaction; and
halting, by the computing device based on the received code, the transaction terminal from outputting the generated code.

5. The method of claim 3, further comprising:
transmitting, by the computing device, to the mobile device, an authorization notification including the session ID;
receiving, by the computing device, from the mobile device a second transaction request, wherein the second transaction request includes the sessionID, identification information, and a biometric authentication status;
re-authorizing the user to conduct the transaction at the transaction terminal, the re-authorization comprising;
identifying, in the storage based on the sessionID, the record of the previously authorized transaction;
verifying that the received identification information corresponds to the profile associated with the record in the storage,
determining, based on the biometric authentication status, that the user has been biometrically authenticated by the mobile device;
identifying the transaction terminal identifier associated with the record in the storage;
transmitting, by the computing device, to the transaction terminal based on the re-authorization, a second authorization notification that advances the transaction at the transaction terminal.

6. The method of claim 5, wherein the step of authorizing the user further comprises:
identifying, by the computing device, based on the user profile, a transaction account associated with the user profile; and
determining, by the computing device, based on the identified transaction account and the transaction terminal associated with the associated stored code, that the user is authorized to conduct the transaction at the transaction terminal using the identified one or more transaction accounts.

7. The method of claim 1, wherein the identification information is a key that is unique to the user and the mobile device, and wherein the step of authorizing the user comprises:
determining that the received key corresponds to a previously stored key in the storage;
identifying, by the computing device, from the storage, a transaction account associated with the stored key; and
determining, by the computing device, based on the code and the identified transaction accounts, that the user is authorized to conduct the transaction at the transaction terminal using the transaction account.

8. The method of claim 7, further comprising:
receiving, by the computing device, transaction details concerning the transaction; and
wherein the step of determining that the user is authorized to conduct the transaction at the transaction terminal further comprises:
retrieving, by the computing device, one or more access rules associated with the identified transaction account, and
determining, by the computing device, based on the transaction details, that the user is authorized to conduct the transaction at the terminal using the identified transaction account in accordance with the one or more access rules.

9. The method of claim 8, further comprising:
instructing, by the computing device, one or more remote computing devices that are associated with the transaction terminal to process the transaction according to the transaction details and the identified transaction account.

10. The method of claim 8, further comprising:
  authorizing, by the computing device, the user to conduct the transaction at the transaction terminal according to the transaction details and the identified transaction account.

\* \* \* \* \*